United States Patent
Barak et al.

(10) Patent No.: US 6,913,684 B1
(45) Date of Patent: Jul. 5, 2005

(54) METHOD FOR REMOVAL OF SOLID DEPOSITS FROM ELECTRODE SURFACES IN WATER DISINFECTING SYSTEMS USING ELECTROLYTIC CELLS, AND A DEVICE FOR USE THEREOF

(75) Inventors: Yaakov Barak, Kfar-Saba (IL); Haim Haziza, Even Yehuda (IL)

(73) Assignee: B.H. .Technologies 1998 Ltd., Kfar-Sara (IL)

(*) Notice: Subject to any disclaimer, the term of this patent is extended or adjusted under 35 U.S.C. 154(b) by 0 days.

(21) Appl. No.: 10/130,710

(22) PCT Filed: Nov. 19, 2000

(86) PCT No.: PCT/IL00/00771
§ 371 (c)(1),
(2), (4) Date: Jul. 29, 2002

(87) PCT Pub. No.: WO01/38232
PCT Pub. Date: May 31, 2001

(30) Foreign Application Priority Data

Nov. 22, 1999 (IL) .................................................. 133084

(51) Int. Cl.⁷ ................................................ C02F 1/461
(52) U.S. Cl. ..................... 205/742; 205/687; 204/228.3; 204/242; 204/275.1; 204/278.5
(58) Field of Search ................................. 205/742, 687; 204/228.3, 242, 275.1, 278.5

(56) References Cited

U.S. PATENT DOCUMENTS 3,527,617 A * 9/1970 Prober .......................... 429/15
3,873,434 A * 3/1975 King ............................ 204/212
5,328,574 A * 7/1994 Mercier ....................... 205/744
5,389,210 A    2/1995 Silveri
5,858,199 A * 1/1999 Hanak .......................... 205/687

FOREIGN PATENT DOCUMENTS

DE          19812801        9/1999
GB          1539521       * 1/1979

* cited by examiner

Primary Examiner—Arun S. Phasge
(74) Attorney, Agent, or Firm—Lowe Hauptman & Berner, LLP

(57) ABSTRACT

A method for removal of solid deposits from surfaces of electrodes of a DC electrolytic cell for disinfecting of water in a closed system, especially in a swimming pool, SPA or hot tub, includes simultaneous spinning the water over the electrode surfaces and electrolytic release of the deposits from the surfaces without interruption of the disinfecting process. The method further includes a) changing the polarity of the electrodes of the cell at predetermined frequency for electrochemically releasing the deposited scale from the electrode surfaces; b) circulating the water through a hydrocyclone containing a DC electrolytic cell for disinfecting of the water so that the deposits are washed off the electrodes of the cell; c) periodically removing the scale particles from a drained chamber located at the bottom of the hydrocyclone.

22 Claims, 4 Drawing Sheets

METHOD FOR REMOVAL OF SOLID DEPOSITS FROM ELECTRODE SURFACES IN WATER DISINFECTING SYSTEMS USING ELECTROLYTIC CELLS, AND A DEVICE FOR USE THEREOF

FIELD OF THE INVENTION

The present invention relates to water disinfecting systems, especially to those for swimming pools, whirlpool baths (sometimes called "Jacuzzi" and hereinafter referred to as SPA) and hot tubs. More specifically, the invention relates to the systems of electrolytic disinfecting of water and to a method and device for removal of calcium carbonate and magnesium carbonate (scale) deposits from the electrode surfaces.

BACKGROUND OF THE INVENTION

Disinfecting of water in closed systems, such as swimming pools, SPA, hot tubs and the like with oxidizing substances, such as active chlorine, ozone and others, produced by electrolyzing water and inorganic salts contained therein is well known and effectively used. It is also well known, however, that this process can be gradually inhibited by the formation of deposits, such as scale made of calcium carbonate and magnesium carbonate, on the electrode surfaces up to complete interruption of the flow of water through the electrolytic cell.

In a method disclosed by international application WO 99 16715, deposits are removed from the electrodes in the process of disinfecting of water by the stream of the water running through the electrolytic cell. The success of this method regarding removal of the deposits is limited by the water flow rate value. In this method, the water flow rate cannot exceed certain limit without deterioration of parameters of the electrolysis process.

Ep 0 175 123 describes an attempt to resolve the problem created by the deposits by regularly changing both the direction of water running through the disinfecting electrolytic cell and the polarity of the electrodes in the cell. To reinforce the effectiveness of said two factors, the electrolytic cell is equipped with special turbulence grate. This method, however, relates to disinfecting of water used in medical devices dealing with small volumes of related apparatuses and low water flow rates. Furthermore, the method requires an additional water storage reservoir and a complicated control circuit optionally including a microprocessor.

U.S. Pat. Nos. 5,580,438 and 5,389,210 etc., by Michael R. Silveri disclose an elaborated system and devices for removal of scale de posits from disinfecting electrodes by use of an additional pump and movable parts that wash the deposits off the electrodes. Due to its complexity, such system increases the maintenance needs and reduces the overall reliability of the swimming pool/SPA operation.

The present invention relates to the process of disinfecting of water in closed systems, especially water of swimming pools, SPA and hot tubs, where comparatively big volumes of water are involved. While preserving the principle of simultaneously disinfecting the water and removing dissolved scale from the water by electrolysis, the present invention provides an economical and more efficient and effective method of removal of the deposits due to synergy effect arising from changing the polarity of electro des of the cell and water turbulence. To achieve this effect, the electrolytic cell is placed in a hydrocyclone. In the present invention, the limitation imposed on water flow rate by the requirements of electrolysis is compensated by the effect of rotation of water and centrifugal forces arising in the hydrocyclone. This effect allows cleaning the scale deposits from the electrodes without any movable parts, which provides an effective maintenance-free device.

SUMMARY OF THE INVENTION

The present invention provides a method for removal of solid deposits from surfaces of electrodes of a DC electrolytic cell for disinfecting of water in a closed system, especially in a swimming pool, SPA or hot tub, by simultaneous electrolytic release of said deposits from said surfaces and spinning the water over said electrode surfaces without interruption of the disinfecting process. The said method comprises:

changing the polarity of the electrodes in the electrolytic cell at predetermined frequency for electrochemically releasing the deposited scale from the electrode surfaces;

circulating the water through a hydrocyclone containing said DC electrolytic cell for disinfecting of the water so that said deposits are washed off the electrodes of the cell;

periodic removing the scale particles from a drain chamber located at the bottom of the hydrocyclone.

The electrolytic cell for disinfecting of water is in flow connection with said swimming pool, SPA or hot tub through a multiple pipe circuit containing a circulation/service pump and several jet/main pumps. According to the present invention, the electrolytic cell is functioning only if the circulation/service pump is in operation.

There are two modes of operation regarding the disinfecting of water in the above-mentioned closed systems, based on this arrangement:

1) "A low voltage mode" with a voltage ranging from 2 to 6 volts DC applied to the electrolytic cell;
2) "A high voltage mode" with a voltage ranging from 6 to 12 volts DC applied to the electrolytic cell.

The water disinfecting system operates in the low voltage mode only when said circulation/service pump is in operation. In this mode, aforesaid low DC voltage is applied to and disconnected from the electrodes of the electrolytic cell for respective pre-determined time periods.

In a preferred embodiment of the present invention, the electrolytic cell can be connected with the source of said low DC voltage upon an indication of a water flow sensor operatively placed after said circulation/service pump.

The low voltage can also be connected to the electrolytic cell upon an indication given by a coil transformer located on the phase wire of the motor of said circulation/service pump.

The high voltage mode of operation is in use when the circulation/service pump and at least one of said jet/main pumps are in operation. The voltage source is automatically disconnected with a fixed predetermined delay after the last of said jet/main pumps stops. In the high voltage mode of operation, said high voltage is applied to the electrolytic cell according to at least two water flow rate indications simultaneously given by water flow sensors operatively placed after said circulation/service pump and after at least one of said main/jet pumps.

The high voltage can also be applied to the electrolytic cell according to the indications given by coil transformers located on the phase wires of the motors of said circulation/service pump and at least one jet/main pump.

In these two modes of operation, the polarity of the voltage is changed with a pre-determined frequency.

Both the low and the high voltage applied to the electrolytic cell can be automatically regulated according to the indications of a sensor of oxidation/reduction potential or free/active chlorine concentration.

The present invention further provides a maintenance-free device operating according the aforesaid method for removal of solid deposits from surfaces of electrodes used in a DC electrolytic cell for disinfecting of water in a closed system.

The said device comprises:
a) At least one electrolytic cell for disinfecting the water.
b) A hydrocyclone containing said electrolytic cell and connected with said SPA/swimming pool/hot tub through a multiple pipe circuit having a circulation/service pump and, optionally, at least one jet/main pump.
c) A drain chamber located under the bottom of said hydrocyclone and having a drain pipe with a tap for periodical removal of the solid particles of said deposit.
d) A system control unit operating said electrolytic cell so as the source of constant voltage is connected to said electrolytic cell and the polarity of electrodes of the cell is automatically changed with predetermined frequency for separating solid deposits from the electrode surfaces.

The electric circuit provides low voltage and high voltage operation modes of the SPA/swimming pool/hot tub disinfecting system according to the method of the invention.

In order to make the electrolytic cell function only if the circulation/service pump is in operation, said control circuit is connected to an electric output of the water flow sensor operatively placed after the circulation/service pump.

In order to alternately connect the electrolytic cell to and disconnect it from the source of the low voltage of 2 to 6 Volts DC for respective pre-determined time periods, said control circuit is connected to a timer.

In order to connect the electrolytic cell to the source of high voltage of 6 to 12 Volts DC and disconnect the cell from said voltage with a fixed pre-determined delay after the last of said jet/main pumps stops, the system control unit is connected to a timer and an electric output of a water flow sensor operatively placed after the circulation/service pump, as well as to electric outputs of water flow sensors operatively placed after said jet/main pumps.

Said control circuit is also connected to an electric output of a reduction/oxidation potential sensor or free chlorine sensor for regulating the voltage level of the electrodes according to the concentration of the free/active chlorine or the REDOX potential in the water of said closed system.

In a preferred embodiment of the present invention, the system control unit of the device according to the invention can also be connected to the coil transformers located on the phase wires of the circulation/service pump motor and at least one of said jet/main pumps' motors in order to apply low or high voltage to said cell.

If required, said control circuit can comprise only electronic elements.

BRIEF DESCRIPTION OF THE DRAWINGS

The present invention will be described in detail by FIGS. 1–4. This detailed description is not intended to limit the scope of the present invention, but only to illustrate the preferred embodiment.

DETAILED DESCRIPTION OF PREFERRED EMBODIMENTS

Figure 1:
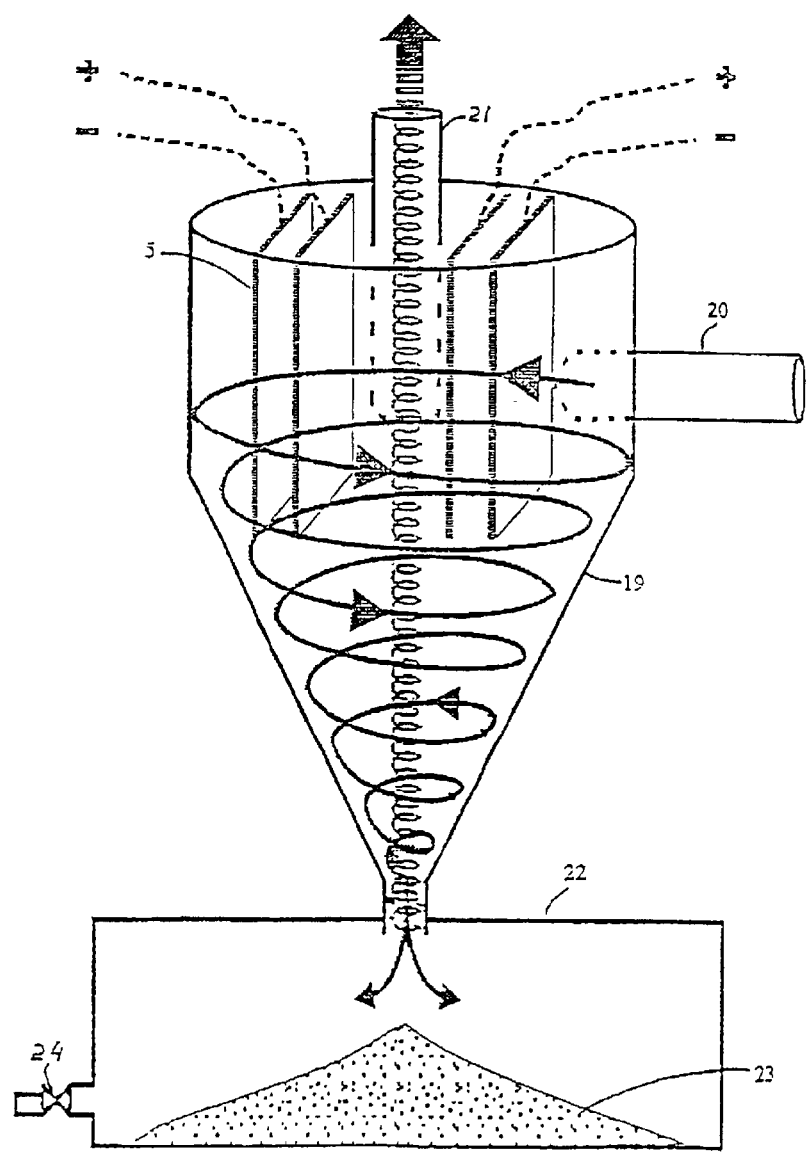
FIG. 1 illustrates a scheme of the device according to the present invention.

FIG. 1 illustrates electrolytic cell (5) placed in hydrocyclone (19). Hydrocyclone (19) is connected with the multiple pipe circuit SPA (16) through connections (20), (21). Building up the deposits on electrodes of the cell is effectively prevented owing to the synergy effect arising from two different effects taking place in the hydrocyclone:
a) the effect of electrolytic release of the deposits from the surfaces of said electrodes by changing polarity of the electrodes at a pre-determined frequency;
b) the effect of washing the deposits off the electrode surfaces due to circulating the water through said hydrocyclone and spinning the water over the electrodes. The spinning is caused by conical surface of hydrocyclone (19).

Solid particles (23) of the deposits are collected in drain chamber (22) located at the bottom of hydrocyclone (19) and are periodically removed therefrom through drain connection (24).

Figure 2:
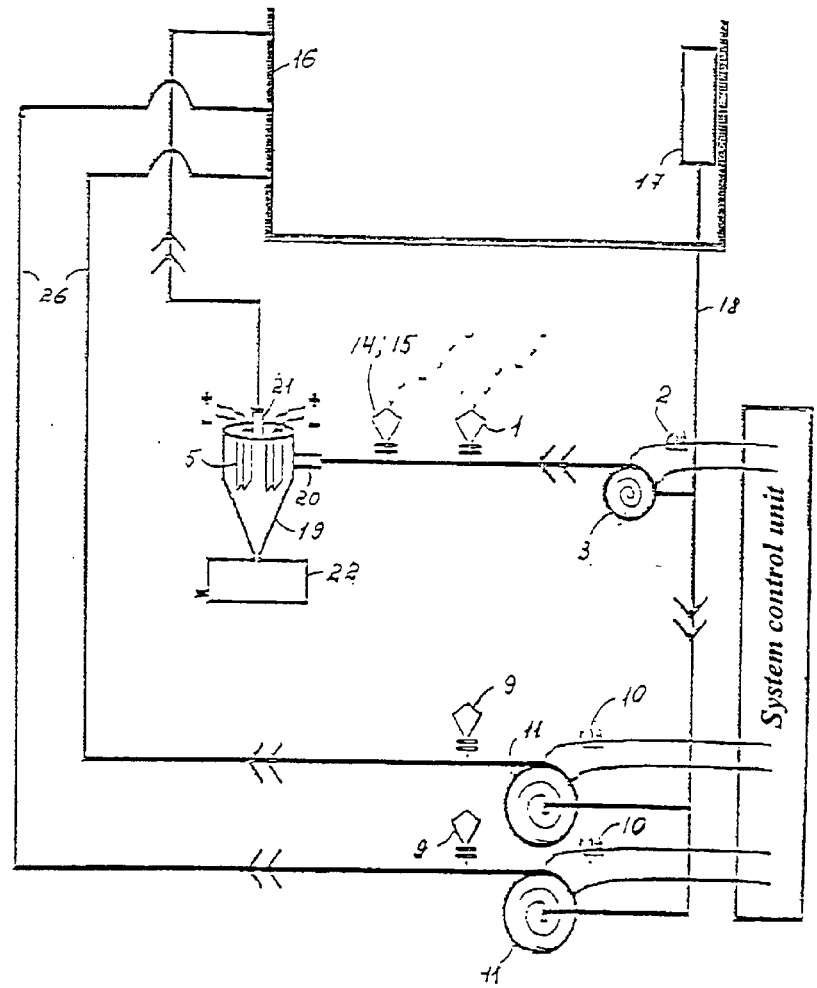
FIG. 2 illustrates a SPA pipe circuit including said device.

FIG. 2 illustrates the complete operation system of disinfecting of water in the SPA.

The system relates to two operation modes of the SPA, depending on needs of its users and requirements to the water chlorinating level.

The low voltage operation mode is brought into effect when only circulation pump (3) is in operation.

The high voltage operation mode proceeds if at least one of jet/main pumps (11) is functioning alongside circulation/service pump (3). Jet/main pumps (11) pump water from filter (17) to the jets of SPA (16) through suction pipe line (18) and pressure pipe line (26).

Figure 3:
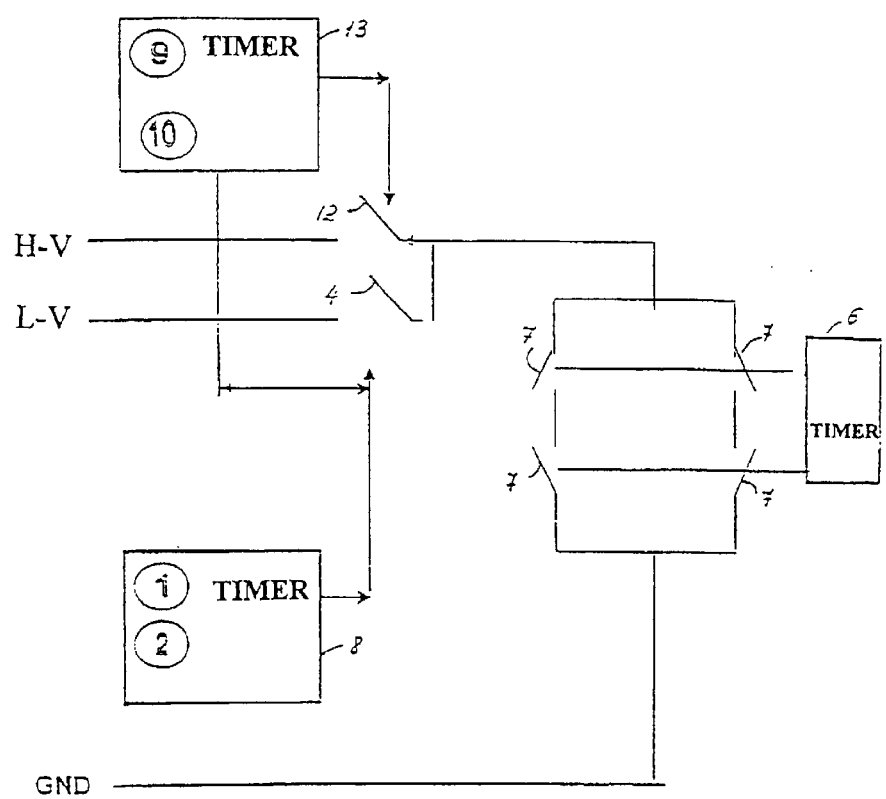
FIG. 3 illustrates modes of low/high voltage control by means of water flow sensors or transformer coils.
Figure 4:
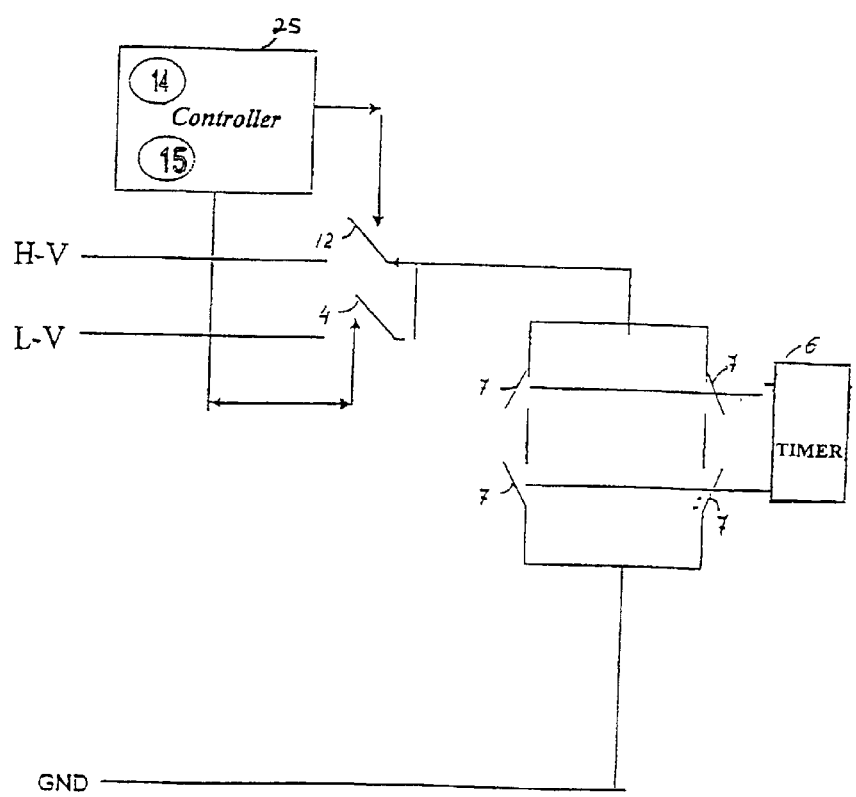
FIG. 4 illustrates modes of free-chlorine concentration control by means of a REDOX-meter or a free-chlorine concentration sensor.

In order to supply 2–6 Volts DC to electrolytic cell (5) over the low voltage operation mode, water flow sensor (1) or transformer coil (2) activate switch (4) through timer (8) (See FIG. 3). Timer (8) and switch (4) are parts of the system control unit (see FIG. 2). Over the high voltage operation mode, electrolytic cell (5) is connected to a source of DC voltage of 6 to 12 Volts to increase the level of chlorinating of water. To provide this connection, above-mentioned water flow sensor (1) or a transformer coil (2) alongside any of water flow sensors (9) or transformer coils (10) activates switch (12), also relating to said system control unit, and switches off switch (4) (See FIG. 3).

2 hours after the last of pumps (11) stops, timer (13) turns off switch (12) and closes switch (4) to resume said low voltage mode (See FIG. 3).

Electrolytic cell (5) can be connected to a source of DC voltage only if permanent flow of water through said cell is provided. To meet this requirement, the system control unit disconnects electrolytic cell (5) from any source of DC voltage upon a minimum indication given by water flow sensor (1) operatively placed after circulation/service pump (3) (See FIG. 2).

Said polarity change of the electrodes of electrolytic cell (5) is allowed every 20 minutes over each of aforesaid two modes by switches (7) activated by timer (6) (see FIG. 3). Timer (6) and switches (7) also relate to said system control unit.

In another preferred embodiment, the level of chlorinating of water is regulated by means of a REDOX-meter (14) or a free-chlorine concentration sensor (15). REDOX-meter (14) or free-chlorine concentration sensor (15) signals to controller (25), which activates switches (4) or (12) according to pre-determined cutoff values.

What is claimed is:
1. A method for removal of solid deposits from surfaces of electrodes of a DC electrolytic cell used for disinfecting water circulated in a closed system without interruption of the disinfecting process, said method comprising:

a. providing a hydrocyclone;

b. placing said DC electrolytic cell within said hydrocyclone:

c. changing the polarity of the electrodes of said cell at a predetermined frequency for electrochemically releasing said deposits from the electrode surfaces;

d. simultaneously with step c, circulating the water by a circulation/service pump through the hydrocyclone containing the DC electrolytic cell to disinfect the water and wash said released deposits off the electrode surfaces;

e. Periodically removing the released deposits from a drain chamber located at the bottom of said hydrocyclone.

2. The method according to claim 1, wherein no voltage is applied to the electrodes of said electrolytic cell if the circulation/service pump is out of operation.

3. The method according to claim 1, wherein, in step c, a voltage is applied to the electrodes of said electrolytic cell, said voltage is a low voltage ranging from 2 to 6 volts DC with the polarity of said voltage being changed at the predetermined frequency;

said method further comprising alternately applying said low voltage to and disconnecting said low voltage from the electrodes in predetermined time periods, provided that the circulation/service pump is in operation, and jet/main pumps of said closed system are out of operation.

4. The method according to claim 3, wherein said low voltage is applied to the electrodes of said electrolytic cell according to a water flow indication given by a water flow sensor operatively placed downstream of the circulation/service pump.

5. A method according to claim 3, wherein said low voltage is applied to the electrodes of said electrolytic cell according to an indication given by a coil transformer located on the phase wire of the motor of said circulation/serving pump.

6. The method according to claim 1, wherein, in step c, a voltage is applied to the electrodes of said electrolytic cell, said voltage is a high voltage ranging from 6 to 12 volts DC with the polarity of said voltage being changed at the predetermined frequency, provided that the circulation/service pump and at least one of jet/main pumps of said closed system are operated or have been in operation since the last time that the circulation/service pump was in operation.

7. The method according to claim 6, wherein said voltage is automatically interrupted with a fixed delay after the last of said jet/main pumps stops.

8. The method according to claim 6, wherein said high voltage is applied to the electrodes of the electrolytic cell according to at least two water flow rate indications simultaneously given by water flow sensors operatively placed downstream of said circulation/service pump and at least one of said jet/main pumps.

9. A method according to claim 6, wherein said high voltage is applied to the electrodes of said electrolytic cell according to indications given by coil transformers located on the phase wires of the motors of said circulation/service pump and at least one of said jet/main pumps.

10. The method according to claim 1, wherein, in step c, a voltage is applied to the electrodes of said electrolytic cell, an amplitude of said voltage being regulated by means of an oxidation/reduction potential sensor or free/active chlorine concentration sensor to be in the range of 2–12 volts DC, according to a pre-determined setting for the REDOX potential or free chlorine concentration.

11. The method according to claim 10, wherein said voltage is adjusted to be from 2 to 6 volts DC with the polarity of said voltage being changed at the predetermined frequency and is alternately applied to and disconnected from the electrodes in predetermined time periods, provided that the circulation/service pump is in operation, and jet/main pumps of said closed system are out of operation.

12. The method according to claim 10, wherein said voltage is adjusted to be from 6 to 12 volts DC with the polarity of said voltage being changed at the predetermined frequency, provided that the circulation/service pump and at least one of jet/main pumps of said closed system are operated or have been in operation since the last time that the circulation/service pump was in operation.

13. The method according to claim 1, wherein said closed system is selected from the group consisting of a swimming pool, SPA and hot tub.

14. The method according to claim 1, wherein the water is introduced tangentially into the hydrocyclone and withdrawn axially therefrom.

15. The method according to claim 1, wherein said hydrocyclone and the electrodes of said DC electrolytic cell contained therein are kept stationary relative to a pool of water of the closed system through which said water circulates.

16. A maintenance-free water disinfecting device having a capability of removing solid deposits from surfaces of electrodes of a DC electrolytic cell used for disinfecting water in a closed system which includes one of SPA, pool and hot tub, said device comprising a. at least one said DC electrolytic cell for disinfecting the water, b. a hydrocyclone containing said electrolytic cell and being connected with said one of SPA, pool and hot tub through a multiple pipe circuit having a circulation/service pump and at least one jet/main pump;

c. a drain chamber located under the bottom of said hydrocyclone and having a drain pipe with a tap for periodical removal of solid particles of said deposits;

d. a system control unit operating said electrolytic cell to selectively connect a source of a constant voltage to the electrodes of said electrolytic cell and to automatically change the polarity of said voltage on the electrodes with a pre-determined frequency for releasing the solid particles of said deposits from the electrode surfaces.

17. The device according to claim 16, wherein said system control unit is connected to a timer and to an electric output of a water flow sensor operatively placed downstream of said circulation/service pump in order to alternately connect and disconnect the electrodes of the electrolytic cell to and from the source of said voltage which is a low voltage ranging from 2 to 6 volts DC for predetermined time periods.

18. The device according to claim 16, wherein said system control unit is connected to a timer and an electric output of a water flow sensor operatively placed downstream of said circulation/service pump and to electric outputs of water flow sensors operatively placed downstream of said at least one said jet/main pump in order to connect the electrodes of the electrolytic cell to the source of said voltage which is a high voltage ranging from 6 to 12 volts DC and to disconnect the electrodes of said cell from the source of said voltage with a fixed delay after the last of said at least one jet/main pump stops.

19. The device according to claim 16, wherein said system control unit is connected to an electric output of a reduction/oxidation potential sensor or free chlorine sensor in order to regulate said voltage of the electrodes according to the concentration of free/active chlorine in the water of said closed system.

20. The device according to claim 16, wherein said system control unit is connected to a coil transformer located on the phase wire of the motor of the circulation/service pump in order to apply said voltage which is a low voltage ranging from 2 to 6 volts DC to the electrodes of the electrolytic cell.

21. The device according to claim 20, wherein said system control unit is connected to coil transformers located on the phase wires of the motors of the circulation/service pump and said at least one jet/main pump in order to apply said voltage which is a high voltage ranging from 6 to 12 volts DC to the electrodes of said cell.

22. The device according to claim 16, wherein said system control unit contains only electronic elements.

* * * * *

UNITED STATES PATENT AND TRADEMARK OFFICE
CERTIFICATE OF CORRECTION

PATENT NO. : 6,913,684 B1
DATED : July 5, 2005
INVENTOR(S) : Yaakov Barak and Haim Haziza It is certified that error appears in the above-identified patent and that said Letters Patent is hereby corrected as shown below:

<u>Title page,</u>
Item [73], Assignee, "B.H. .Technologies 1998 Ltd., Kfar-Sara (IL)" should be
-- B. H. Technologies 1998 Ltd., Kfar-Saba (IL) --.

Signed and Sealed this

Twenty-third Day of August, 2005

JON W. DUDAS
*Director of the United States Patent and Trademark Office*